US011733717B2

(12) United States Patent
Mei et al.

(10) Patent No.: US 11,733,717 B2
(45) Date of Patent: Aug. 22, 2023

(54) UNMANNED AERIAL VEHICLE CONTROL METHOD AND SYSTEM BASED ON MOVING BASE

(71) Applicant: ZHUHAI ZIYAN UAV CO., LTD., Zhuhai (CN)

(72) Inventors: Canwen Mei, Zhuhai (CN); Jiangping Wang, Zhuhai (CN); Lipeng Tan, Zhuhai (CN); Yuliang Chen, Zhuhai (CN); Shuai Hu, Zhuhai (CN); Lifang Liu, Zhuhai (CN)

(73) Assignee: ZHUHAI ZIYAN UAV CO., LTD.

( * ) Notice: Subject to any disclaimer, the term of this patent is extended or adjusted under 35 U.S.C. 154(b) by 285 days.

(21) Appl. No.: 17/061,398

(22) Filed: Oct. 1, 2020

(65) Prior Publication Data

US 2022/0011785 A1 Jan. 13, 2022

(30) Foreign Application Priority Data

Jul. 10, 2020 (CN) .......................... 202010660428.4

(51) Int. Cl.
*B64C 39/02* (2023.01)
*G05D 1/00* (2006.01)
(Continued)

(52) U.S. Cl.
CPC ............. *G05D 1/106* (2019.05); *B64C 25/24* (2013.01); *B64C 39/024* (2013.01); *B64D 47/08* (2013.01);
(Continued)

(58) Field of Classification Search
CPC ........ G05D 1/106; G05D 1/102; G05D 1/101; G05D 1/00; B64C 25/24; B64C 39/024;
(Continued)

(56) References Cited

U.S. PATENT DOCUMENTS 6,382,556 B1 * 5/2002 Pham ................... B64C 29/0033
244/6
7,154,434 B1 * 12/2006 Sego .................... G01S 13/5242
342/28

(Continued)

FOREIGN PATENT DOCUMENTS

AU         2008218928 A1 *  9/2009  ............. G01C 23/00
CM            111813148       10/2020  ............... G05D 1/10
(Continued)

OTHER PUBLICATIONS

Chen et al., "Group scheduling filtering algorithm for facilitating GPS positioning accuracy" *Journal of Safety Science and Technology*, vol. 16, No. 10, Oct. 2020, with machine English translation, 14 pages.

(Continued)

*Primary Examiner* — Yonel Beaulieu
(74) *Attorney, Agent, or Firm* — Hayes Soloway P.C.

(57) ABSTRACT

An unmanned aerial vehicle (UAV) control method includes a takeoff process, a following process and a landing process, wherein the takeoff process includes the following steps: unlocking the UAV, and detecting the current horizontal position of the UAV in the horizontal direction and the current altitude of the UAV in the vertical direction; determining whether the current horizontal position and the current altitude meet takeoff criteria, and controlling the UAV to bounce off and enter into a takeoff state if the determination result is positive. The system provided by the present disclosure employs the above-mentioned method to control a UAV. The method and system provided by the present disclosure meet three functional requirements for a UAV on a moving base platform, namely, stable takeoff, following process and accurate landing, thus decrease the difficulties in the use of a UAV on a moving platform.

20 Claims, 6 Drawing Sheets

(51) Int. Cl.
*B64D 47/08* (2006.01)
*G08G 5/00* (2006.01)
*G08G 5/02* (2006.01)
*G05D 1/10* (2006.01)
*B64C 25/24* (2006.01)

(52) U.S. Cl.
CPC ......... *G08G 5/0065* (2013.01); *G08G 5/0069* (2013.01); *G08G 5/02* (2013.01); *B64U 2201/104* (2023.01)

(58) Field of Classification Search
CPC .......... B64C 2201/145; B64C 2201/08; B64C 2201/141; B64C 2201/205; B64C 2201/208; B64C 39/02; B64D 47/08; G08G 5/0065; G08G 5/0069; G08G 5/02; G08G 5/0021; G08G 5/0013; G08G 5/025; G08G 5/00; G01S 13/913
See application file for complete search history.

(56) References Cited

U.S. PATENT DOCUMENTS

| | | | | |
|---|---|---|---|---|
| 11,427,305 | B1* | 8/2022 | Wiegman | B64C 13/38 |
| 2007/0146167 | A1* | 6/2007 | Miller | G08G 5/0078 340/963 |
| 2010/0096491 | A1* | 4/2010 | Whitelaw | B64G 1/00 725/75 |
| 2020/0130864 | A1* | 4/2020 | Brockers | B60L 53/37 |
| 2020/0317338 | A1 | 10/2020 | Wang | |
| 2020/0341117 | A1* | 10/2020 | Sandford | G01S 17/93 |
| 2021/0339842 | A1* | 11/2021 | Sauer | B64C 25/06 |

FOREIGN PATENT DOCUMENTS

| | | | | |
|---|---|---|---|---|
| CN | 107697286 | 2/2018 | | B64C 35/00 |
| CN | 111766900 | 10/2020 | | G05D 1/12 |
| CN | 111796605 | 10/2020 | | G05D 1/12 |
| EP | 3714689 A1 * | 9/2020 | | |
| WO | WO-2010043370 A1 * | 4/2010 | | G05D 1/0684 |
| WO | WO-2019226917 A1 * | 11/2019 | | B64C 39/022 |
| WO | WO-2022074643 A1 * | 4/2022 | | |

OTHER PUBLICATIONS

Gu et al., "Performance analysis of multi-mode GNSS kinematic precise point positioning" *Journal of Qinghai University*, vol. 38, No. 5, Oct. 2020, with machine English translation, 14 pages.

Li et al., "Speed Model Building and LOS Compensation in a Dynamic Platform Optoelectronic Tracking System" *Computer Measurement & Control*, 17(8), 2009, English abstract, 4 pages.

Liu, Yubo "Discussion on Autonomous Landing Technology of Vehicle-mounted UAV" China Academic Journal Electronic Publishing House, 2020, with machine English translation, 5 pages.

Rao et al., "Real time vision-based autonomous precision landing system for UAV airborne processor" *Computer Engineering*, Oct. 26, 2020, with machine English translation, 24 pages.

Shen et al., "A review of ground- and ship-based guidance approaches for autonomous landing of unmanned aerial vehicle (UAV)" *Journal of Beijing University of Aeronautics and Astronautics*, Aug. 14, 2020, with machine English translation, 29 pages.

Sun et al., "Research on Control of Drone Automatic Landing on Moving Unmanned Surface Vehicle" *Electronics Optics & Control*, Jul. 22, 2020, with machine English translation, 17 pages.

Wang et al., "Influence on platform INS by initial launched parameter error in moving base state" *Journal of Projectiles, Rockets, Missiles and Guidance*, May 6, 2020, with machine English translation, 16 pages.

Yang et al., "Research on the Alignment of Moving Base for MU/GPS Integrated Navigation System" *Aero Weaponry*, No. 6, Dec. 2005, English abstract, 5 pages.

Zhao et al., "Several Key Technologies of Unmanned Aerial Vehicle—Unmanned Surface Vehicle Cooperative Autonomous Landing" *Shipbuilding of China*, vol. 61, Special 12020, Aug. 2020, with machine English translation, 18 pages.

* cited by examiner

UNMANNED AERIAL VEHICLE CONTROL METHOD AND SYSTEM BASED ON MOVING BASE

I. TECHNICAL FIELD

The present invention relates to the technical field of unmanned aerial vehicles (UAVs), in particular to an unmanned aerial vehicle (UAV) control method based on a moving base and a UAV control system employing the method.

II. BACKGROUND

As the unmanned aerial vehicle (UAV) technology is developed rapidly, UAVs have been widely applied in various fields, because UAVs have advantages such as light weight, small size, low cost, high maneuverability, high stealthiness, long time of flight, and is especially suitable for conducting missions with high risks.

Conventional UAVs are generally categorized into fixed-wing UAVs and multi-rotor UAVs. Fixed-wing UAVs have advantages of high flight velocity, long flight duration and long flight range, but require a runway for running during takeoff and landing, and can't hover in the air; multi-rotor UAVs are capable of taking off and landing vertically, have no special requirement for the takeoff and landing site, and can hover in the air, but their flight velocity and flight duration are incomparable to those of fixed-wing UAVs.

At present, UAVs have some shortcomings, for example: (1) it is difficult to take off on a moving base, (2) it is difficult to follow the moving base, and (3) it is difficult to land accurately on the moving base.

(1) Existing UAVs can only take off on the ground or the surface of a stationary object, i.e., take off on a stationary base, and their flight trajectories make reference to an inertial coordinate system. In a case of takeoff on a moving base, there is an interaction between the frame of the UAV and the base before the UAV leaves the surface of the base completely. Consequently, the UAV can't adjust its position and velocity normally as in the air. As a result, the integral control values in the position-velocity controller may be accumulated easily and result in a high given value of acceleration. Consequently, the takeoff attitude of the UAV may be too large, and the UAV may roll over easily; another problem is that the UAV may slide off the moving base platform if the moving base platform bumps or sways severely.

(2) Existing UAVs can't acquire the movement state of the ground moving base, and can't achieve an automatic moving base following function. Manual intervention and control is required at all times to enable the UAV to fly synchronously with the moving base.

(3) After the flight mission is accomplished, the UAV can only return to the takeoff spot or land on the surface of a stationary platform designated by the ground station, and can't automatically return to a position right above the moving base and finally land on the moving base reliably and accurately.

III. SUMMARY

A main object of the present disclosure is to provide a UAV control method based on a moving base, which meets three functional requirements for a UAV on a moving base platform, namely, stable takeoff, following process and accurate landing, thus decreases the difficulties in the use of a UAV on a moving platform.

Another object of the present disclosure is to provide a UAV control system based on a moving base, which meets three functional requirements for a UAV on a moving base platform, namely, stable takeoff, following process and accurate landing, thus decreases the difficulties in the use of a UAV on a moving platform.

To attain the above-mentioned main object, the UAV control method based on a moving base provided by the present disclosure includes a takeoff process, a following process, and a landing process, wherein the takeoff process includes the following steps: unlocking the UAV, and detecting the current horizontal position of the UAV in the horizontal direction and the current altitude of the UAV in the vertical direction; determining whether the current horizontal position and the current altitude meet takeoff criteria, and controlling the UAV to bounce off and enter into a takeoff state if the determination result is positive; in the following process, the movement state of the moving base platform is collected by a moving base station, data is transmitted transparently with the UAV, and the UAV performs coordinated flight control of position and velocity loops after receiving the movement state of the moving base platform; in the landing process, the UAV carries out positioning and detection of the moving base platform, a return route is planned according to the real-time position of the moving base platform, the UAV is guided to return to a position above the moving base platform and fly synchronously, and the relative position of the UAV is controlled in the descending stage so that the UAV accurately lands on the moving base platform.

In a further embodiment, an electromagnet driving circuit is triggered by a flight control system of the UAV to control an electromagnet mechanism installed the landing gear of the UAV, so that the electromagnet mechanism generates magnetic force to attract an iron surface of the moving base platform when the electromagnet mechanism is in an energized state.

In another embodiment, after a takeoff command is triggered, an altitude controller of the flight control system of the UAV is enabled while a horizontal controller of the flight control system of the UAV remains disabled; after the altitude controller is enabled, a desired altitude of the UAV is increased from the current position, the throttle control value outputted from the altitude controller increases continuously, the UAV attracts the surface of the moving base platform by virtue of the attraction force generated by the electromagnet mechanism, a given value of the attitude of the UAV is the current attitude, the attitude of the UAV sways with the surface of the moving base platform; a power-off command of the electromagnet mechanism is triggered when determining that the throttle control value outputted from the altitude controller is greater than a set value of takeoff throttle; the UAV bounces off the surface of the moving base platform quickly after the electromagnet mechanism is de-energized, the altitude controller remains enabled, the desired altitude increases continuously, the horizontal controller remains disabled, the given value of the attitude of the UAV is 0, the attitude of the UAV remains stable and takes off, leaving the surface of the moving base platform; the horizontal controller is enabled after it is determined that the altitude of the UAV is greater than a set value of altitude, and the given value of the attitude of the UAV is the output value of the horizontal controller; thus, the operation of takeoff from the moving base is accomplished.

In a further embodiment, a vertical control model is established in the vertical direction by the altitude controller, which includes a vertical position P controller, a vertical velocity P controller, and a vertical acceleration PI controller; the UAV acquires current altitude, current vertical velocity and current vertical acceleration via a combined navigation system; the desired altitude is inputted to the vertical control model; after the takeoff command is triggered, the desired altitude is increased in accordance with a ramp signal from the current position and is fed to the vertical position P controller, the vertical velocity P controller, and the vertical acceleration PI controller sequentially, so that a throttle control value is generated so as to control the UAV to take off.

In a further embodiment, a horizontal control model is established in the horizontal direction by the horizontal controller, which includes a horizontal position P controller and a horizontal velocity PI controller; the UAV acquires current horizontal position, current horizontal velocity and current horizontal acceleration via a combined navigation system; a desired horizontal position is inputted to the horizontal control model; before takeoff is triggered, the horizontal position P controller and the horizontal velocity PI controller are disabled, and the given value of the attitude of the UAV is determined according to the current attitude of the UAV, i.e., the attitude of the UAV changes as the moving base platform sways; before the set value of takeoff altitude is reached after takeoff is triggered, the horizontal position P controller and the horizontal velocity PI controller remain disabled, and the given value of the attitude of the UAV is set to 0, i.e., the UAV remains a horizontal attitude after it takes off; after the UAV reaches the set value of takeoff altitude, the horizontal position P controller and the horizontal velocity PI controller are enabled, the desired horizontal position is fed to the horizontal position P controller and the horizontal velocity PI controller, a horizontal acceleration control value is generated and converted into a given value of the attitude of the UAV to control the attitude of the UAV; thus, the takeoff of the UAV on the moving base platform is completed.

In a further embodiment, in the horizontal direction, three different forms of horizontal controllers are set according to the takeoff states, and different forms of horizontal controllers are switched according to different takeoff states, wherein the three corresponding takeoff states are a state before takeoff is triggered, a state before the set value of takeoff altitude is reached after takeoff is triggered, and a state after the set value of takeoff altitude is reached.

In a further embodiment, the following process includes a moving base following mode, in which the moving base station sends inertial navigation velocity and inertial navigation position of the moving base platform to the UAV through a data transmission channel, and the UAV performs velocity tracking control; when the UAV performs velocity tracking control, its given velocity is the sum of given synchronous horizontal velocity, given approaching velocity and given manual velocity, wherein the desired horizontal position is obtained by performing an integral operation on the given velocity, and the approaching velocity is generated by a tracking differentiator; the input of the tracking differentiator is the difference between the real-time position of the moving base platform and the position of the UAV, and the control is embodied in that the UAV flies to the a position right above the moving base platform for synchronous flight.

In a further embodiment, the following process includes a manual following mode, in which the moving base station sends inertial navigation velocity and inertial navigation position of the moving base platform to the UAV through a data transmission channel, and the UAV performs velocity tracking control; when the UAV performs velocity tracking control, its given velocity is the sum of given synchronous horizontal velocity, given approaching velocity and given manual control velocity, wherein the desired horizontal position is obtained by performing an integral operation on the given velocity, and the approaching velocity is generated by a tracking differentiator; the input of the tracking differentiator is the real-time position of the moving base platform added by a manual position adjustment value and then subtracted by the position of the UAV, and the control is embodied in that the UAV flies to the a position right above the moving base platform for synchronous flight, and the relative position of the UAV is adjusted by manual control at the same time.

In a further embodiment, an infrared indicator is installed at a UAV landing spot on the moving base platform, an infrared visual sensor is installed at the onboard terminal of the UAV, the orientations $\alpha$ and $\beta$ of the infrared indicator are acquired by the infrared visual sensor, and a ranging radar at the onboard terminal of the UAV is coaxial with the infrared camera for measuring the distance L between the infrared camera and the moving base platform and calculating the relative position X, Y of the landing spot of the UAV.

In a further embodiment, the landing process includes a base station guiding stage and an infrared guiding stage; in the base station guiding stage, the moving base station sends inertial navigation velocity and inertial navigation position of the moving base platform to the UAV through a data transmission channel, and the UAV performs velocity tracking control, the control effect is embodied in that the UAV flies to a position right above the moving base for synchronous flight; the landing process enters into the infrared guiding stage from the base station guiding stage after the infrared sensor detects the position of the infrared indicator.

In a further embodiment, in the infrared guiding stage, the UAV receives inertial navigation velocity of the moving base platform sent by the moving base station, and calculates the position of the infrared indicator as a new inertial navigation position of the position of the base station, the UAV performs velocity tracking control, and its given velocity is the sum of synchronous horizontal velocity and approaching velocity, wherein the approaching velocity is generated by the tracking differentiator, the input of the tracking differentiator is the difference between the position of the infrared indicator and the position of the UAV, and the control is embodied in that the UAV flies to a position right above the infrared indicator for synchronous flight.

To attain the other object described above, the UAV control system based on a moving base provided by the present disclosure includes a moving base station, a UAV ground station, and a UAV, wherein the moving base station is connected between the UAV ground station and the UAV for transmitting data packets between the UAV ground station and the UAV transparently, acquiring the movement state of a moving base platform, acquiring information on the movement state of the moving base platform from a Global Positioning System (GPS) unit, packing up the data and sending the data packets to the UAV via a data transmission onboard terminal; the UAV performs coordinated flight control of position and velocity loops after receiving the data packets; wherein the moving base station includes a moving base platform, an onboard data transmitter, a GPS antenna, a GPS unit, a base station processor, and a data transmission ground terminal.

Apparently, a UAV moving base system is designed in the present disclosure to overcome the difficulties in takeoff on a moving base, following the moving base, and landing on the moving base, which are encountered when a UAV is used on a moving base, in order to reduce the difficulties in the use of a UAV on a moving base. By acquiring the information on the movement state of the moving base, adjusting an attitude controller, a velocity controller, and a position controller, three functional requirements for a UAV on a moving base platform, i.e., stable takeoff, intelligent following the moving base platform in the flight, and accurate landing on the moving base platform, are met, thereby the difficulties in the use of a UAV on a moving platform are reduced.

Therefore, the UAV provided by the present disclosure can take off on the roof of a moving vehicle or on a ship; the UAV can follow the moving base in the flight and always be in a certain relative position with respect to the moving base, and the relative position can be adjusted by manual control; the UAV can automatically return to a position right above the moving base and finally accurately land on the moving base; the UAV can fully autonomously takeoff on the moving base, follow the moving base in the flight, and accurately land on the moving base.

Hereunder the present disclosure will be further detailed in embodiments, with reference to the accompanying drawings.

V. EMBODIMENTS

As shown in FIGS. 1-11, the UAV control method based on a moving base in the present disclosure includes a takeoff process, a following process, and a landing process. The UAV according to the present disclosure can take off on the roof of a moving vehicle or on a moving ship platform, follow the vehicle or ship in the flight, and land accurately on the vehicle or ship, which forms an "air-ground" and "air-sea" cooperative operation system, and is applicable to the fields of marine patrol UAVs, maritime search and rescue UAVs, and in-vehicle tethered UAVs and the like.

Figure 1:
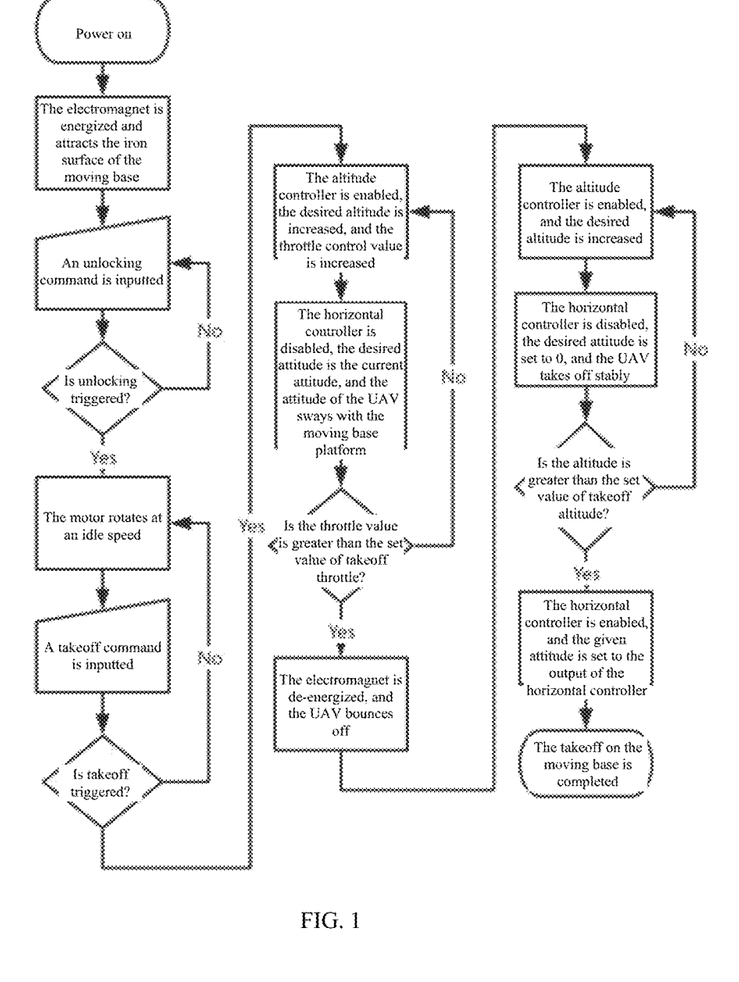
FIG. 1 is a flow chart of the takeoff process in an embodiment of the UAV control method based on a moving base in the present disclosure.

Embodiment of UAV Control Method Based on a Moving Base:

In this embodiment, as shown in FIG. 1, the takeoff process comprises the following steps: unlocking the UAV 30, and detecting the current horizontal position of the UAV 30 in the horizontal direction and the current altitude of the UAV 30 in the vertical direction; determining whether the current horizontal position and the current altitude meet takeoff criteria, and controlling the UAV 30 to bounce off and enter into a takeoff state if the determination result is positive, wherein, the step of determining whether the current horizontal position and the current altitude meet takeoff criteria specifically includes: triggering a takeoff command, so that an altitude controller of the flight control system 31 of the UAV 30 is enabled while a horizontal controller of the flight control system 31 of the UAV 30 remains disabled; increasing a desired altitude of the UAV 30 from the current position after the altitude controller is enabled, the throttle control value outputted from the altitude controller increases continuously, while the UAV 30 attracts the surface of the moving base platform 8 by virtue of the attraction force generated by an electromagnet mechanism 33; setting a given value of the attitude of the UAV 30 as the current attitude, so that the attitude of the UAV sways with the surface of the moving base platform 8; triggering a power-off command of the electromagnet mechanism 33 when determining that the throttle control value outputted from the altitude controller is greater than a set value of takeoff throttle; the UAV 30 bounces off the surface of the moving base platform 8 quickly after the electromagnet mechanism 33 is de-energized, the altitude controller remains enabled, the desired altitude increases continuously, the horizontal controller remains disabled, the given value of the attitude of the UAV is 0, the UAV 30 takes off with a stable attitude and leaves the surface of the moving base platform 8; the horizontal controller is enabled after it is determined that the altitude of the UAV 30 is greater than a set value of altitude, and the given value of the attitude of the UAV is set to the output value of the horizontal controller; thus, the operation of takeoff from the moving base is accomplished.

In this embodiment, the method further includes the following step before the current horizontal position of the UAV 30 in the horizontal position and the current altitude of the UAV 30 in the vertical direction are detected: installing the electromagnet mechanism 33 on the landing gear of the UAV 30, triggering an electromagnet driving circuit 32 by the flight control system 31 of the UAV 30 to control the electromagnet mechanism 33, so that the electromagnet mechanism 33 generates magnetic force to attract an iron surface of the moving base platform 8 when the electromagnet mechanism 33 is in an energized state. For example, an electromagnet mechanism 33 is installed on the landing gear of the UAV, the flight control system 31 of the UAV outputs high level/low level via an TO port to trigger an electromagnet driving circuit 32 for control. The electromagnet mechanism 33 is in an energized state and generate magnetic force that attracts the iron surface of the moving base platform 8 when high level is outputted via the TO port.

Specifically, the takeoff process includes the following steps: A. powering on the UAV, so that the electromagnet mechanism 33 is energized and attracts the iron surface of the moving base platform 8, wherein, after the UAV 30 is powered on and the flight control system is initialized, the electromagnet mechanism 33 is energized, and the magnetic force generated by the electromagnet mechanism 33 increases the attraction and friction force between the UAV 30 and the moving base platform 8, and is helpful for the UAV 30 to resist the bump and sway of the moving base and can prevent the UAV from rolling over or sliding off.

B. inputting an unlocking command and determining whether the unlocking command is triggered; the motor of the UAV rotates at an idle speed if the determination result is positive.

C. inputting a takeoff command and determining whether the takeoff command is triggered; the altitude controller is enabled, the desired altitude is increased, the throttle control value is increased, and the horizontal controller remains disabled, if the determination result is positive, wherein, after the altitude controller is enabled, the desired altitude of the UAV 30 starts to increase from the current position, the throttle control value outputted from the altitude controller increases continuously; under the attraction force generated by the electromagnet mechanism 33, the UAV 30 can't leave the surface of the moving base platform 8, thus the problem of sliding-off of the UAV 30 incurred by bumping is avoided. The given value of the attitude of the UAV is set to the current attitude, and there is no control on the attitude of the UAV, i.e., the UAV sways with the surface of the moving base platform 8; a power-off command for the electromagnet mechanism 33 is triggered when the throttle control value outputted from the altitude controller is greater than the set value of takeoff throttle.

D. cutting off the power supply to the electromagnet mechanism 33, so that the UAV 30 bounces off the surface of the moving base platform 8 quickly, with the horizontal controller kept in the disabled state. The magnetic attraction force disappears after the electromagnet mechanism 33 is de-energized; since the throttle control value from the altitude controller is greater than the set value of takeoff throttle at that point, the lifting power of the rotors is greater than the gravity of the UAV body, thus the UAV 30 bounces off the surface of the moving base platform 8 quickly, while the horizontal controller is kept in the disabled state, and the given value of the attitude of the UAV is set to 0. Therefore, the UAV is kept in a stable attitude, and the problem of rollover of the UAV before the UAV leaves the surface of the moving base platform 8 completely is avoided.

E. enabling the horizontal controller after the UAV 30 leaves the surface of the moving base platform 8 and reaches the desired altitude. Thus, the takeoff operation on the moving base is completed.

Figure 2:
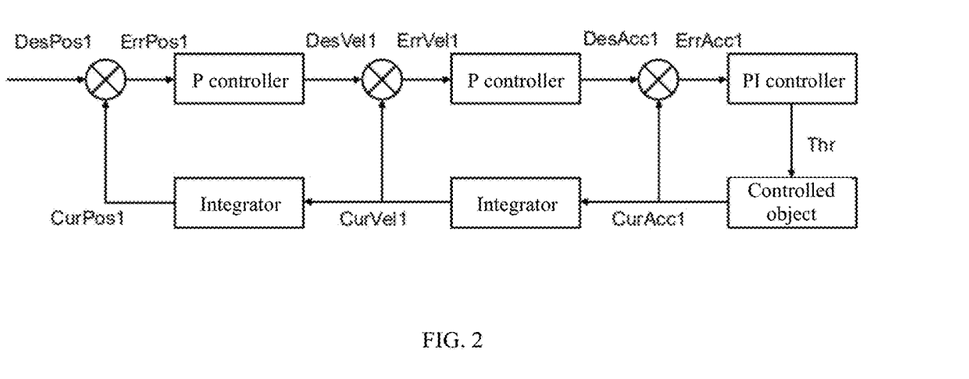
FIG. 2 is a schematic diagram of the vertical control model in an embodiment of the UAV control method based on a moving base in the present disclosure.

A vertical control model is established in the vertical direction by the altitude controller, which includes a vertical position P controller, a vertical velocity P controller, and a vertical acceleration PI controller; the UAV 30 acquires current altitude CurPos, current vertical velocity CurVel and current vertical acceleration CurAcc via a combined navigation system; the desired altitude DesPos is inputted to the vertical control model; after the takeoff command is triggered, the desired altitude DesPos is increased in accordance with a ramp signal from the current position and is fed to the vertical position P controller, the vertical velocity P controller, and the vertical acceleration PI controller sequentially, so that a throttle control value Thr is generated so as to control the UAV 30 to take off.

Figure 3:
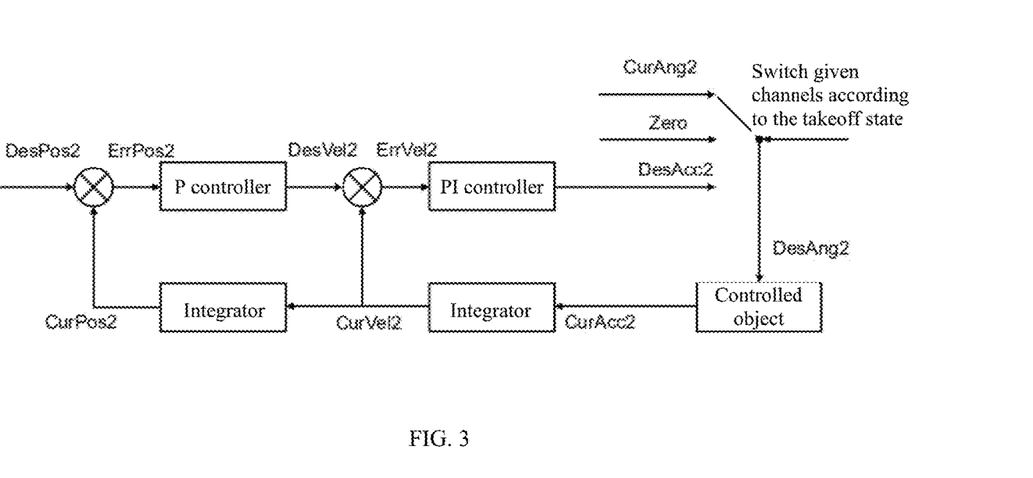
FIG. 3 is a schematic diagram of the horizontal control model in an embodiment of the UAV control method based on a moving base in the present disclosure.

A horizontal control model is established in the horizontal direction by the horizontal controller, which includes a horizontal position P controller and a horizontal velocity PI controller; the UAV 30 acquires current horizontal position CurPos, current horizontal velocity CurVel and current horizontal acceleration CurAcc via a combined navigation system; a desired horizontal position DesPos is inputted to the horizontal control model; before takeoff is triggered, the horizontal position P controller and the horizontal velocity PI controller are disabled, and the desired attitude DesAng of the UAV is determined according to the current attitude CurAng of the UAV, i.e., the attitude of the UAV 30 changes as the moving base platform 8 sways; before the set value of takeoff altitude is reached after takeoff is triggered, the horizontal position P controller and the horizontal velocity PI controller remain disabled, and the desired attitude DesAng of the UAV is set to 0, i.e., the UAV 30 remains in a horizontal state after it takes off; after the UAV 30 reaches the set value of takeoff altitude, the horizontal position P controller and the horizontal velocity PI controller are enabled, the desired horizontal position DesPos is fed to the horizontal position P controller and the horizontal velocity PI controller, a horizontal acceleration control value DesAcc is generated and converted into a desired attitude DesAng of the UAV to control the attitude of the UAV; thus, the takeoff of the UAV 30 on the moving base platform 8 is completed.

In the horizontal direction, three different forms of horizontal controllers are set according to the takeoff states, and different forms of horizontal controllers are switched according to different takeoff states, wherein the three corresponding takeoff states are a state before takeoff is triggered, a state before the set value of takeoff altitude is reached after takeoff is triggered, and a state after the set value of takeoff altitude is reached.

In actual applications, the takeoff solution in this embodiment can solve the problem of rollover and sliding-off of a conventional UAV 30 during takeoff on a moving base, and mainly involves two efforts: (1) an electromagnet mechanism 33 is added; (2) a controller for takeoff on a moving base is designed.

(1) Adding an electromagnet mechanism 33: an electromagnet mechanism 33 is installed on the landing gear of the UAV, high level/low level is outputted by the flight control system 31 of the UAV via an IO port, so as to trigger an electromagnet driving circuit 32 for control, and the control is outputted via the IO port. When the electromagnet mechanism 33 is energized, it can generate magnetic force to attract the iron deck of a ship or the iron roof of a vehicle; when the electromagnet mechanism 33 is de-energized, no magnetic force is generated.

(2) Designing a controller for takeoff on a moving base: taking off on the moving base platform 8 requires to control the position and velocity of the UAV 30 in the vertical direction and the position and velocity of the UAV 30 in the horizontal direction.

In the vertical direction, the position loop employs a vertical position P controller, the velocity loop employs a vertical velocity P controller, and the acceleration loop employs a vertical acceleration PI controller. The position and velocity controllers are shown in FIG. 2 after a takeoff command is triggered.

Where, DesPos1: desired altitude; CurPos1: current altitude; ErrPos1: altitude tracking error, equal to DesPos1−CurPos1; DesVel1: desired vertical velocity; CurVel1: current vertical velocity; ErrVel1: vertical velocity tracking error, equal to DesVel1−CurVel1; DesAcc1: desired vertical acceleration; CurAcc1: current vertical acceleration; ErrAcc1: vertical acceleration tracking error, equal to DesAcc1-CurAcc1; Thr: throttle control value; controlled object: vertical control model.

Specifically, the UAV 30 acquires CurPos1, CurVel1 and CurAcc1 via a combined navigation system, and the input of the control system is desired altitude DesPos1; after a takeoff command is triggered, the desired altitude DesPos1 is increased in accordance with a ramp signal, and is fed to the vertical position P controller, the vertical velocity P controller, and the vertical acceleration PI controller sequentially, so that a throttle control value Thr is generated to control the UAV 30 to take off. After the Thr is greater than the set value of takeoff throttle, the electromagnet is released automatically, and the UAV 30 bounces off slightly and takes off.

In the horizontal direction, there are three different forms of position and velocity controllers, and the different forms of controllers are switched according to different takeoff states. The three corresponding takeoff states are: a state before takeoff is triggered, a state before the set value of takeoff altitude is reached after takeoff is triggered, and a state after the set value of takeoff altitude is reached, as shown in FIG. 3. where, DesPos2: desired horizontal position; CurPos2: horizontal position; ErrPos2: horizontal position tracking error, equal to DesPos2−CurPos2; DesVel2: desired horizontal velocity; CurVel2: current horizontal velocity; ErrVel2: horizontal velocity tracking error, equal to DesVel2−CurVel2; DesAcc2: desired horizontal acceleration; CurAcc2: current horizontal acceleration; CurAng2: current UAV attitude; Zero: given value 0; DesAng2: desired attitude, which may vary depending on the takeoff state and is determined according to different variables.

Specifically, the UAV 30 acquires CurPos2, CurVel2 and CurAcc2 via the combined navigation system, and the input of the control system is the desired horizontal position DesPos2.

Before takeoff, the horizontal position P controller and the horizontal velocity PI controller are disabled. DesAng2 is determined according to CurAng2; the attitude of the UAV 30 changes as the moving base sways, while there is no control value in the roll and pitch directions, so as to avoid rollover of the UAV 30 incurred by the tilting of the rotor plane.

Before the set value of takeoff altitude is reached after takeoff is triggered, the horizontal position P controller and the horizontal velocity PI controller remain disabled, and DesAng2 is set to Zero (0), i.e., the UAV 30 is kept in a horizontal state after it takes off, and moves under inertia without velocity adjustment. Thus, the rotors are prevented from hitting the surface of the moving base platform 8 owing to a large attitude of the UAV when the UAV is near the surface of the moving base platform 8 after it takes off.

After the UAV 30 reaches the set value of takeoff altitude, the horizontal position P controller and the horizontal velocity PI controller are enabled. The desired horizontal position DesPos2 is fed to the horizontal position P controller and the horizontal velocity PI controller, so that a horizontal acceleration control value DesAcc2 is generated and then converted into a desired attitude DesAng2 of the UAV 30 for attitude control of the UAV, and the control is embodied in that the UAV 30 can keep track of the position and velocity in a planned trajectory. Thus, the takeoff on the moving base platform 8 is completed.

Figure 4:
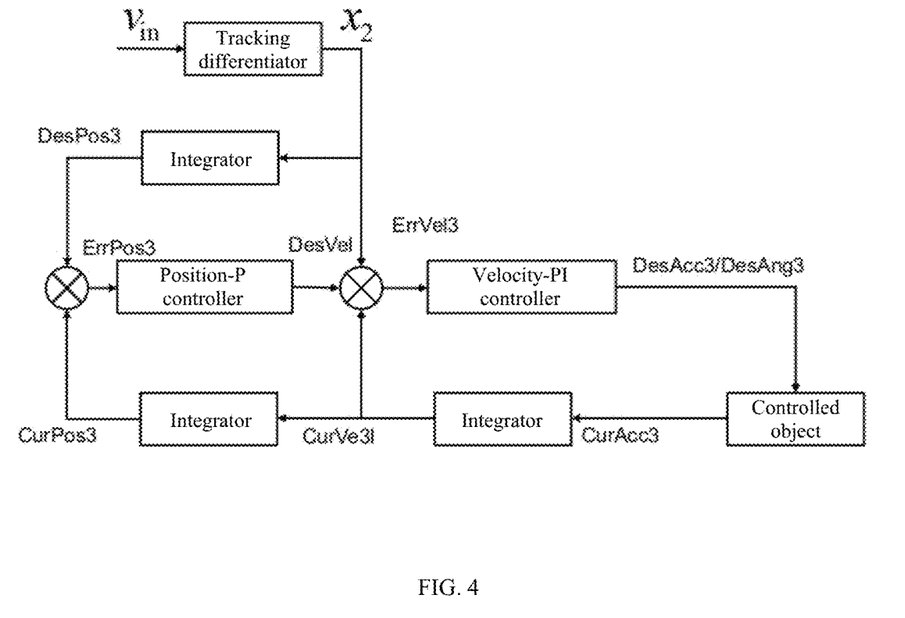
FIG. 4 is a schematic diagram of the horizontal velocity controller in a following process in an embodiment of the UAV control method based on a moving base in the present disclosure.

In this embodiment, in the following process, the movement state of the moving base platform 8 is collected by the moving base station, data is transmitted transparently with the UAV 30, and the UAV 30 performs coordinated flight control of position and velocity loops after receiving the movement state of the moving base platform 8, as shown in FIG. 4.

Figure 5:
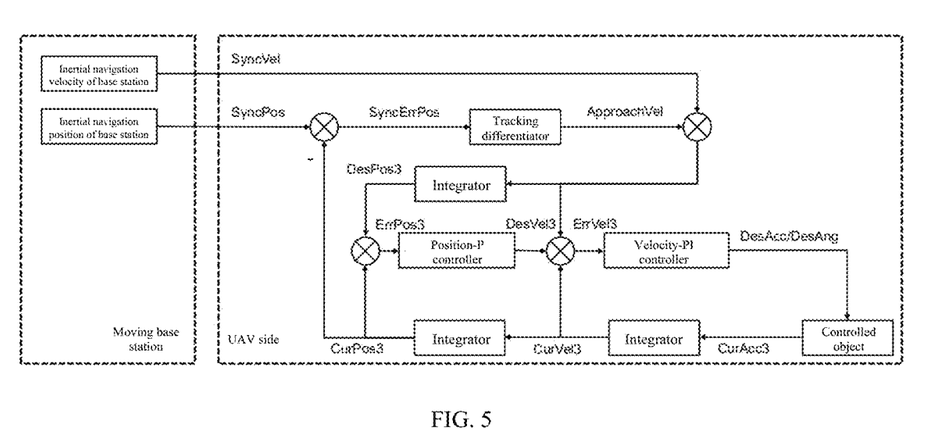
FIG. 5 is a schematic diagram of the moving base following mode in an embodiment of the UAV control method based on a moving base in the present disclosure.

Specifically, the following process includes a moving base following mode, in which the moving base station sends inertial navigation velocity SyncVel and inertial navigation position SyncPos of the moving base platform 8 to the UAV 30 through a data transmission channel, and the UAV 30 performs velocity tracking control.

When the UAV 30 performs velocity tracking control, its given velocity is the sum of given synchronous horizontal velocity SyncVel, given approaching velocity ApproachVel and given manual velocity, wherein the desired horizontal position DesPos is obtained by performing an integral operation on the given velocity, and the approaching velocity ApproachVel is generated by a tracking differentiator; the input of the tracking differentiator is the difference SyncErrPos between the real-time position SyncPos of the moving base platform 8 and the position CurPos of the UAV, and the control is embodied in that the UAV 30 flies to the a position right above the moving base platform 8 for synchronous flight.

Figure 6:
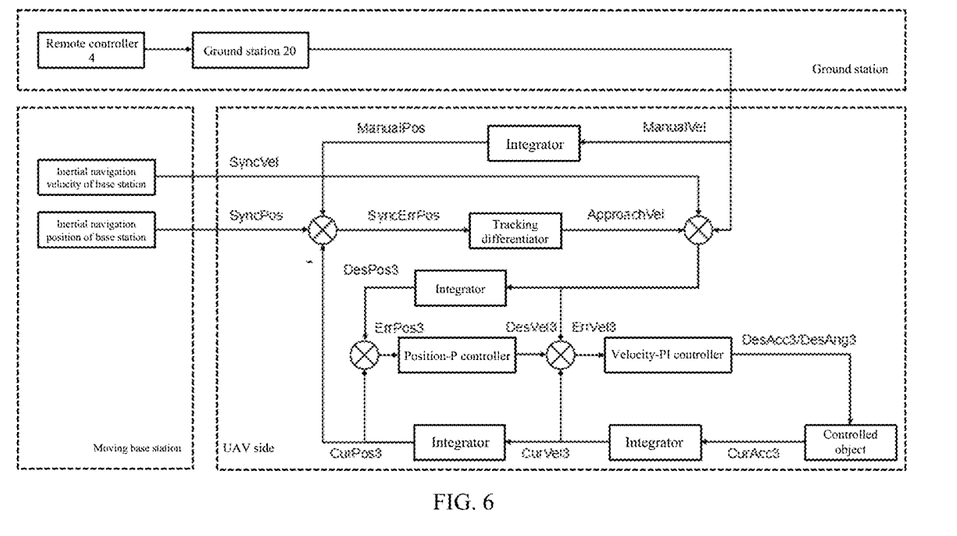
FIG. 6 is a schematic diagram of the manual following mode in an embodiment of the UAV control method based on a moving base in the present disclosure.

In addition, the following process further includes a manual following mode, in which the moving base station sends inertial navigation velocity SyncVel and inertial navigation position SyncPos of the moving base platform 8 to the UAV 30 through a data transmission channel, and the UAV 30 performs velocity tracking control.

When the UAV 30 performs velocity tracking control, its given velocity is the sum of given synchronous horizontal velocity SyncVel, given approaching velocity ApproachVel and given manual velocity, wherein the desired horizontal position DesPos is obtained by performing an integral operation on the given velocity, and the approaching velocity ApproachVel is generated by a tracking differentiator; the input of the tracking differentiator is a difference SyncErrPos obtained by subtracting the position CurPos of the UAV from the sum of the real-time position SyncPos of the moving base platform 8 and a manual position adjustment value ManualPos, and the control is embodied in that the UAV 30 flies to the a position right above the moving base platform 8 for synchronous flight, and the relative position of the UAV 30 is adjusted by manual control at the same time.

In actual applications, the moving base station includes a GPS unit for collecting the movement state of the moving base platform 8, packing up the state data and pushing the data packets to the UAV 30 through a data transmission link; the UAV 30 performs coordinated flight control of position and velocity loops after receiving the movement state of the moving base.

In this embodiment, a second-order nonlinear tracking differentiator is used for trajectory planning. The second-order nonlinear tracking differentiator achieves a good high-frequency noise suppression effect and ensures quick signal tracking. The formula of the second-order nonlinear tracking differentiator is represented by Formula (1):

$$\begin{cases} \dot{x}_1 = x_2 \\ x_2 = -R\mathrm{sign}\left(x_1 - v_{in} + \dfrac{x_2|x_2|}{2R}\right) \end{cases} \quad (1)$$

in the position planning, the second-order nonlinear tracking differentiator is used to plan a velocity control value for approaching position input, the outputted velocity control value and its integral are taken as the input to the horizontal position controller of the UAV, and the control effect is that the UAV 30 is guided to approach directly above the moving base. Suppose the position of the moving base platform 8 is $P_{mb}$, then the position of the UAV is $P_{uav}$.

wherein, $v_{in}$: the difference of horizontal position of the moving base relative to the UAV, i.e., $v_{in}=p_{mb}-p_{uav}$; R: maximum acceleration in position tracking; $x_1$: position value in the tracking of $v_{in}$; $x_2$: planned velocity in the process of tracking of $v_{in}$ by $x_1$, expressed by formula (2).

$$\begin{cases} \dot{x}_1 = x_2 \\ x_2 = -R\mathrm{sign}\left(x_1 - v_{in} + \dfrac{x_2|x_2|}{2R}\right) \end{cases} \quad (2)$$

Wherein, $v_{in}$ is taken as the input to the second-order non-linear tracking differentiator, and the planned velocity $x_2$ is taken as the output; $x_2$ is added to the input of the horizontal velocity control loop of the UAV, the integral of $x_2$ is added to the input of the horizontal position loop, and the control effect is embodied in that the position of the UAV is keeping track the value of $v_{in}$.

In this embodiment, the structure of the horizontal velocity controller in the following process is shown in FIG. 4.

Wherein, DesPos3: desired horizontal position; CurPos3: horizontal position; ErrPos3: horizontal position tracking error, equal to DesPos3-CurPos3; DesVel3: desired horizontal velocity; CurVel3: current horizontal velocity; ErrVel3: horizontal velocity tracking error, equal to DesVel3-CurVel3; DesAcc3: desired horizontal acceleration; CurAcc3: current horizontal acceleration; CurAng3: current UAV attitude.

Specifically, the moving base following mode mainly includes two sub-modes: a moving base following mode and a manual following mode.

In the moving base following mode, the UAV 30 can plan its path, return to a position just above the moving base station, and keep flying synchronously right above the moving base station. The moving base station pushes information including the inertial navigation velocity SyncVel and inertial navigation position SyncPos of the moving base platform 8 to the UAV 30 through the data transmission channel, and the UAV 30 performs velocity tracking control, wherein the given velocity is the sum of the synchronous horizontal velocity SyncVel and the approaching velocity ApproachVel, and the desired position DesPos3 is obtained by performing an integral operation on the given velocity; wherein, the approaching velocity ApproachVel is generated by the tracking differentiator, the input of the tracking differentiator is the difference SyncErrPos between the position SyncPos of the moving base platform 8 and the position CurPos3 of the UAV, and the control effect is embodied in that the UAV 30 flies to a position right above the moving base for synchronous flight, as shown in FIG. 5.

Wherein, SyncPos: synchronous horizontal position of the moving base, equal to the real-time position of the moving base platform 8; SyncVel: synchronous horizontal velocity of the moving base, equal to the real-time velocity of the moving base platform 8; SyncErrPos: horizontal position error in synchronous following, equal to SyncPos-CurPos; ApproachVel: approaching horizontal velocity, which is planned by the tracking differentiator and can be used to guide the UAV 30 to approach the given velocity at the horizontal position of the moving base.

In the manual following mode, the UAV 30 can keep at a fixed position relative to the moving base and fly synchronously, and the relative position can be adjusted by means of a remote controller. The moving base station pushes information including the inertial navigation velocity SyncVel and inertial navigation position SyncPos of the moving base platform 8 to the UAV 30 through the data transmission channel, and the UAV 30 performs velocity tracking control, wherein the given velocity is the sum of the synchronous horizontal velocity SyncVel, the approaching velocity ApproachVel, and manual velocity ManualVel, and the desired position DesPos is obtained by performing an integral operation on the given velocity. The approaching velocity ApproachVel is generated by the tracking differentiator, and the input of the tracking differentiator is a difference SyncErrPos obtained by subtracting the position CurPos3 of the UAV from the sum of the position of the base station SyncPos and a manual position adjustment value ManualPos. The control effect is embodied in that the UAV 30 flies to a position right above the moving base platform 8 for synchronous flight, and the relative position of the UAV 30 can be adjusted and controlled manually at the same time, as shown in FIG. 6:

Wherein, ManualVel: given manual velocity, which is a velocity value given by a person via the remote controller; ManualPos: manual position adjustment value, which is obtained by integrating the given velocity ManualVel.

In this embodiment, in the landing process, the UAV 30 carries out positioning and detection of the moving base platform 8, a return route is planned according to the real-time position of the moving base platform 8, the UAV 30 is guided to return to a position above the moving base platform 8 and fly synchronously, and the relative position of the UAV 30 is controlled in the descending stage so that the UAV 30 accurately lands on the moving base platform 8.

Figure 7:
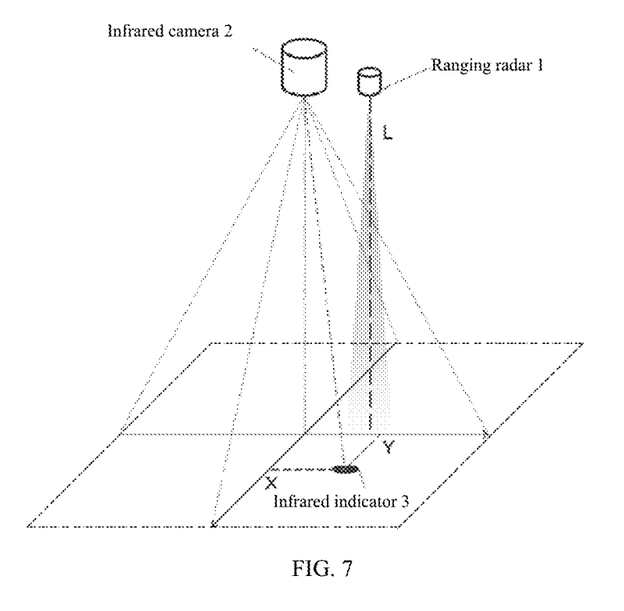
FIG. 7 is a first schematic diagram of the accurate landing guiding system in an embodiment of the UAV control method based on a moving base in the present disclosure.
Figure 8:
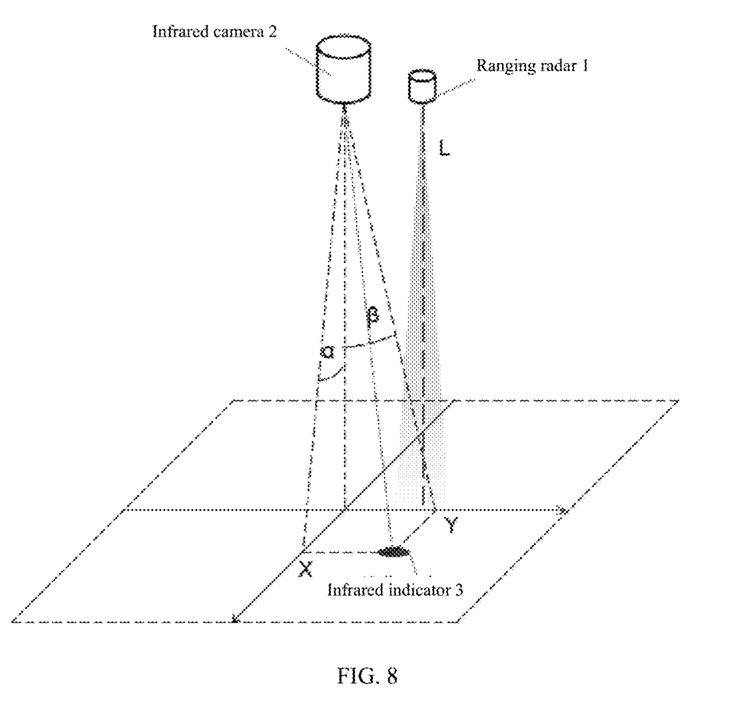
FIG. 8 is a second schematic diagram of the accurate landing guiding system in an embodiment of the UAV control method based on a moving base in the present disclosure.

In this embodiment, an accurate landing guiding system employing an infrared guiding solution is introduced in the landing process, as shown in FIGS. 7 and 8. An infrared indicator is installed at the UAV landing spot on the moving base platform 8, an infrared visual sensor is installed at the onboard terminal of the UAV, the orientations $\alpha$ and $\beta$ of the infrared indicator are acquired by the infrared visual sensor, and a ranging radar at the onboard terminal of the UAV is coaxial with the infrared camera for measuring the distance L between the infrared camera and the moving base platform 8 and calculating the relative position X, Y of the landing spot of the UAV.

Figure 9:
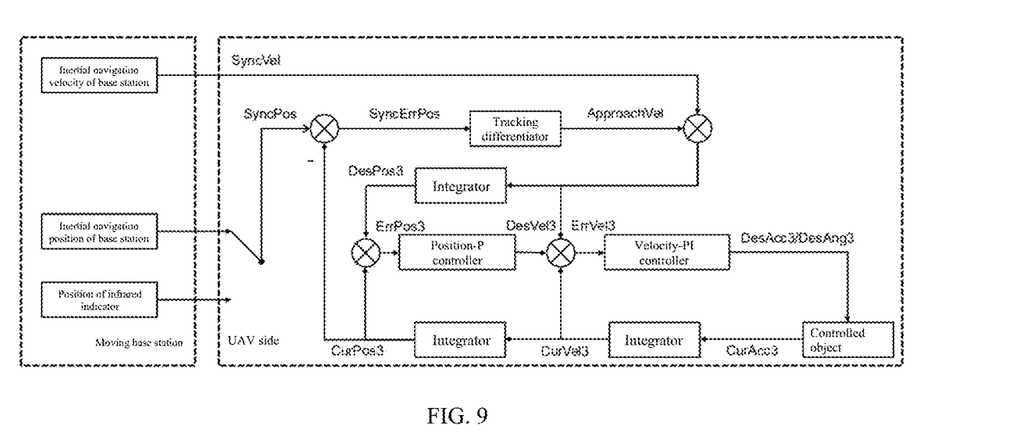
FIG. 9 is a schematic diagram of the horizontal velocity controller in a landing process in an embodiment of the UAV control method based on a moving base in the present disclosure.

Specifically, as shown in FIG. 9, the landing process includes a base station guiding stage and an infrared guiding stage; in the base station guiding stage, the moving base station sends inertial navigation velocity SyncVel and inertial navigation position SyncPos of the moving base platform to the UAV 30 through a data transmission channel, and the UAV 30 performs velocity tracking control, the control effect is embodied in that the UAV 30 flies directly to a position right above the moving base for synchronous flight; the landing process enters into the infrared guiding stage from the base station guiding stage after the infrared sensor detects the position of the infrared indicator.

In the infrared guiding stage, the UAV 30 receives inertial navigation velocity SyncVel of the moving base platform sent by the moving base station, and calculates the position of the infrared indicator as a new inertial navigation position SyncPos of the base station, the UAV 30 performs velocity tracking control, and its given velocity is the sum of synchronous horizontal velocity SyncVel and approaching velocity ApproachVel, wherein the approaching velocity ApproachVel is generated by the tracking differentiator, the input of the tracking differentiator is the difference SyncErrPos between the position SyncPos of the infrared indicator and the position CurPos of the UAV, and the control is embodied in that the UAV 30 flies to a position right above the infrared indicator for synchronous flight.

In actual applications, to realize accurate landing on the moving base, a moving base station and an accurate landing guiding system must be introduced. The accurate landing process on the moving base includes two stages: a base station guiding stage and an infrared guiding stage.

In the base station guiding stage, the moving base station pushes information including inertial navigation velocity SyncVel and inertial navigation position SyncPos of the moving base platform 8 to the UAV 30 through the data transmission channel. The UAV 30 performs velocity tracking control, and the given velocity is the sum of the synchronous horizontal velocity SyncVel and the approaching velocity ApproachVel, wherein, the approaching velocity ApproachVel is generated by the tracking differentiator, the input of the tracking differentiator is the difference SyncErrPos between the position SyncPos of the moving base platform 8 and the position CurPos of the UAV, and the control effect is embodied in that the UAV 30 flies to a position right above the moving base for synchronous flight.

After the infrared sensor detects the position of the infrared indicator, the landing process enters into the infrared guiding stage from the base station guiding stage. In the infrared guidance stage, the UAV 30 receives inertial navigation velocity SyncVel from the moving base platform 8, and calculates the position of the infrared indicator in real time as a more accurate position SyncPos of the moving base platform 8. The UAV 30 performs velocity tracking control, and the given velocity is the sum of the synchronous horizontal velocity SyncVel and the approaching velocity ApproachVel, wherein, the approaching velocity ApproachVel is generated by the tracking differentiator, the input of the tracking differentiator is the difference SyncErrPos between the position SyncPos of the infrared indicator and the position CurPos of the UAV, and the control effect is embodied in that the UAV 30 flies to a position right above the infrared indicator for synchronous flight.

Figure 10:
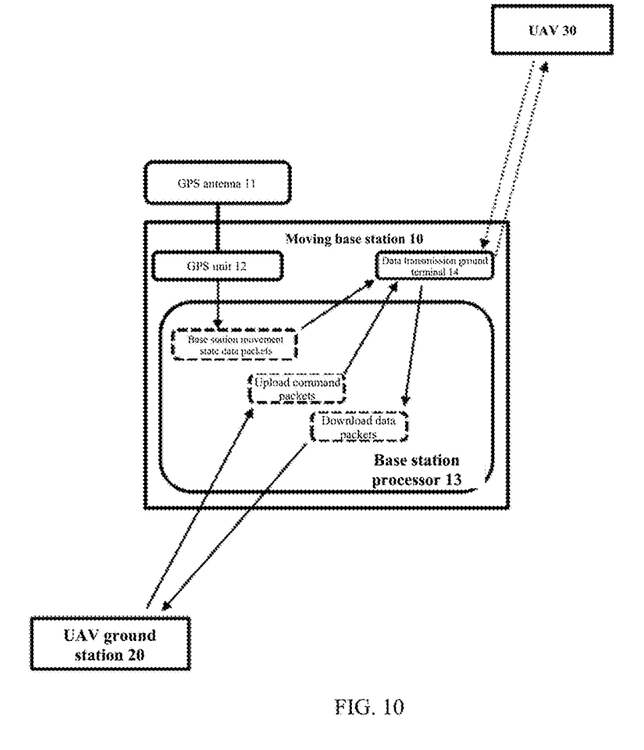
FIG. 10 is a schematic diagram of an embodiment of the UAV control system based on a moving base in the present disclosure.
Figure 11:
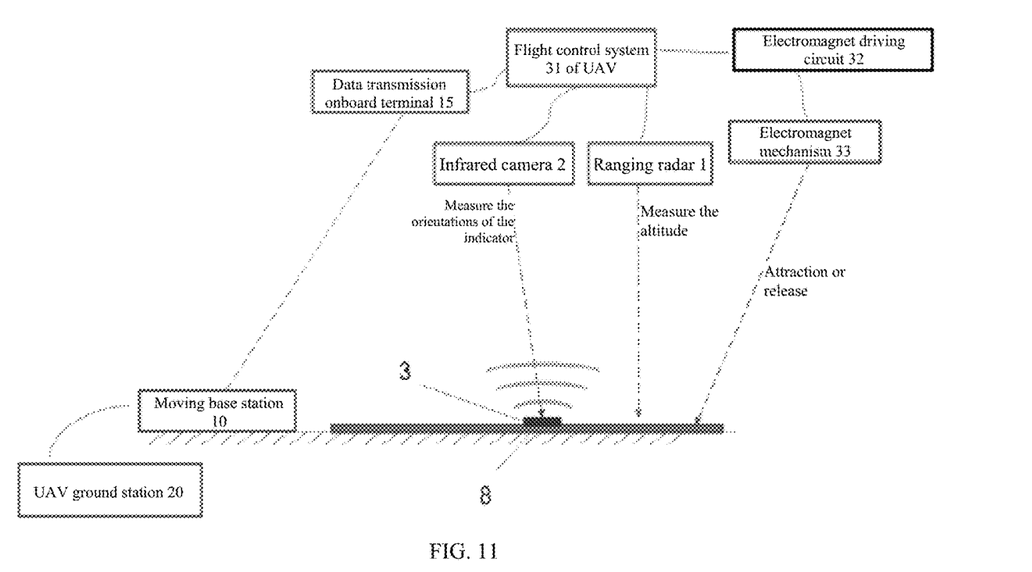
FIG. 11 is a schematic diagram of the moving base station in an embodiment of the UAV control system based on a moving base in the present disclosure.

Embodiment of UAV Control System Based on a Moving Base:

As shown in FIGS. 10 and 11, the UAV control system based on a moving base provided by the present disclosure includes a moving base station 10, a UAV ground station 20, and a UAV 30, wherein the moving base station 10 is connected between the UAV ground station 20 and the UAV 30 for transmitting data packets between the UAV ground station 20 and the UAV 30 transparently, acquiring the movement state of a moving base platform 8, acquiring information on the movement state of the moving base platform 8 from a GPS unit, packing up the data and sending the data packets to the UAV 30 via a data transmission onboard terminal; the UAV 30 performs coordinated flight control of position and velocity loops after receiving the data packets; wherein the moving base station 10 includes a moving base platform 8, a data transmission onboard terminal 15, a GPS antenna 11, a GPS unit 1, a base station processor 13, and a data transmission ground terminal 14. In this embodiment, the data transmission onboard terminal 15 may be a UAV data link, which is used for data transmission between the flight control system and the ground station. The basic principle is that the modulator-demodulator works in a wireless way. The data transmission link is a data transmission system consisting of an onboard radio modem and ground radio modem, which can transmit the attitude, position, altitude and other information of the UAV between the onboard terminal and the ground terminal.

The moving base platform 8 in this embodiment may be a platform on a moving carrier, such as the deck of a ship or the roof of a vehicle, for example, the iron landing surface of the moving base platform 8 in FIG. 11, for the UAV to take off and land. The infrared indicator 3 is installed at the landing spot for UAV on the moving base platform 8, and the GPS antenna 11 is disposed at a distance of 1 to 3 meters from the infrared indicator 3, and the erection elevation of the antenna should not be close to or higher than the elevation of the rotors of the UAV, so as to avoid collision with the rotors. In addition, any obstacle higher than 1 meter within the range of 2 meters of the GPS antenna 11 of the moving base station 10 should be avoided to prevent the satellite signals of the antenna from being blocked. The GPS antenna 11 should be erected according to the actual situation.

Of course, the position of the moving base station may be selected freely. However, a moving base station with a combined navigation module should be aligned in the yaw direction.

In this embodiment, the base station processor may employ a variety of embedded processors capable of parsing the data packets from the positioning module and receiving and forwarding data packets of the base station and the flight control system.

In this embodiment, the data transmission ground terminal is a part of the moving base station, and is used in association with data transmission onboard terminal 15 in pair, there are two (i.e., onboard terminal and ground terminal) in one group for data transmission and receiving.

Apparently, a UAV moving base system is designed in the present disclosure to overcome the difficulties in takeoff on a moving base, following the moving base, and landing on the moving base, which are encountered when a UAV is used on a moving base, in order to reduce the difficulties in the use of a UAV on a moving base. By acquiring the information on the movement state of the moving base, adjusting an attitude controller, a velocity controller, and a position controller, three functional requirements for a UAV on a moving base platform 8, i.e., stable takeoff, intelligent following the moving base platform in the flight, and accurate landing on the moving base platform 8, are met, thereby the difficulties in the use of a UAV on a moving platform are reduced.

Therefore, the UAV provided by the present disclosure can take off on the roof of a moving vehicle or on a ship; the UAV can follow the moving base in the flight and always be in a certain relative position with respect to the moving base, and the relative position can be adjusted by manual control; the UAV can automatically return to a position right above the moving base and finally accurately land on the moving base; the UAV can realize autonomous takeoff on the moving base, following the moving base in the flight, and accurate landing on the moving base.

It should be pointed out that while some preferred embodiments of the present disclosure are described above, the inventive design concept is not limited to those embodiments, and any non-substantive modification made to the present disclosure on the basis of the design concept shall be deemed as falling in the protection scope of the present disclosure.

The invention claimed is:

1. An unmanned aerial vehicle (UAV) control method based on a moving base, from a takeoff process to a landing process, wherein:
the takeoff process comprises the following steps:
unlocking the UAV, and detecting the current horizontal position of the UAV in the horizontal direction and the current altitude of the UAV in the vertical direction;
determining whether the current horizontal position and the current altitude meet takeoff criteria, and controlling the UAV to bounce off and enter into a takeoff state if the determination result is positive;
in a following process, a movement state of the moving base is collected by a moving base station, data is transmitted transparently with the UAV, and the UAV performs coordinated flight control of position and velocity loops after receiving the movement state of the moving base platform;
in the landing process, the UAV carries out positioning and detection of the moving base platform, a return route is planned according to the real-time position of the moving base platform, the UAV is guided to return to a position above the moving base platform and fly synchronously, and the relative position of the UAV is controlled in the descending stage so that the UAV accurately lands on the moving base platform.

2. The control method according to claim 1, further comprising the following step before the current horizontal position of the UAV in the horizontal direction and the current altitude of the UAV in the vertical direction are detected:
triggering an electromagnet driving circuit by a flight control system of the UAV to control an electromagnet mechanism installed the landing gear of the UAV, so that the electromagnet mechanism generates magnetic force to attract an iron surface of the moving base platform when the electromagnet mechanism is in an energized state.

3. The control method according to claim 2, wherein the step of determining whether the current horizontal position and the current altitude meet the takeoff criteria specifically comprises:
triggering a takeoff command, so that an altitude controller of the flight control system of the UAV is enabled while a horizontal controller of the flight control system of the UAV remains disabled; after the altitude controller is enabled, a desired altitude of the UAV is increased from the current position, a throttle control value outputted from the altitude controller increases continuously, the UAV attracts the surface of the moving base platform by virtue of the attraction force generated by the electromagnet mechanism; setting a given attitude of the UAV to the current attitude, so that the attitude of the UAV sways with the surface of the moving base platform;
triggering a power-off command of the electromagnet mechanism when determining that the throttle control value outputted from the altitude controller is greater than a set value of takeoff throttle;
the UAV bounces off the surface of the moving base platform quickly after the electromagnet mechanism is de-energized, the altitude controller remains enabled, the desired altitude increases continuously, the horizontal controller remains disabled, the given attitude of the UAV is 0, the UAV takes off in a stable attitude and leaves the surface of the moving base platform; the horizontal controller is enabled after it is determined that the altitude of the UAV is greater than a set value of altitude, and the given attitude of the UAV is set to the output value of the horizontal controller; thus, the operation of takeoff from the moving base is accomplished.

4. The control method according to claim 3, wherein:
a vertical control model is established in the vertical direction by the altitude controller, which comprises a vertical position P controller, a vertical velocity P controller, and a vertical acceleration PI controller; the UAV acquires current altitude, current vertical velocity and current vertical acceleration via a combined navigation system; the desired altitude is inputted to the vertical control model; after the takeoff command is triggered, the desired altitude is increased in accordance with a ramp signal from the current position and is fed to the vertical position P controller, the vertical velocity P controller, and the vertical acceleration PI controller sequentially, so that a throttle control value is generated so as to control the UAV to take off.

5. The control method according to claim 3, wherein:
a horizontal control model is established in the horizontal direction by the horizontal controller, which comprises a horizontal position P controller and a horizontal velocity PI controller; the UAV acquires current horizontal position, current horizontal velocity and current horizontal acceleration via a combined navigation system; a desired horizontal position is inputted to the horizontal control model;
before takeoff is triggered, the horizontal position P controller and the horizontal velocity PI controller are disabled, and the given attitude of the UAV is determined according to changes of the attitude of the UAV as the moving base platform sways;
before the set value of takeoff altitude is reached after takeoff is triggered, the horizontal position P controller and the horizontal velocity PI controller remain disabled, and the given attitude of the UAV is set to 0, such that the UAV remains in a horizontal attitude after it takes off;
after the UAV reaches the set value of takeoff altitude, the horizontal position P controller and the horizontal velocity PI controller are enabled, the desired horizontal position is fed to the horizontal position P controller and the horizontal velocity PI controller, a horizontal acceleration control value is generated and converted into a given attitude of the UAV, and the attitude of the UAV is controlled; thus, the takeoff of the UAV on the moving base platform is completed.

6. The control method according to claim 5, wherein:
in the horizontal direction, three different forms of horizontal controllers are set according to the takeoff states, and different forms of horizontal controllers are switched according to different takeoff states, wherein the three corresponding takeoff states are a state before takeoff is triggered, a state before the set value of takeoff altitude is reached after takeoff is triggered, and a state after the set value of takeoff altitude is reached.

7. The control method according to claim 1, wherein the coordinated flight control of position and velocity loops specifically comprises:

the following process comprises a moving base following mode, in which the moving base station sends inertial navigation velocity and inertial navigation position of the moving base platform to the UAV through a data transmission channel, and the UAV performs velocity tracking control;

when the UAV performs velocity tracking control, its given velocity is the sum of given synchronous horizontal velocity, given approaching velocity and given manual velocity, wherein the desired horizontal position is obtained by performing an integral operation on the given velocity, and the approaching velocity is generated by a tracking differentiator; the input of the tracking differentiator is the difference between the real-time position of the moving base platform and the position of the UAV, and the control is embodied in that the UAV flies to the a position right above the moving base platform for synchronous flight.

8. The control method according to claim 7, wherein the coordinated flight control of position and velocity loops specifically comprises:

the following process comprises a manual following mode, in which the moving base station sends inertial navigation velocity and inertial navigation position of the moving base platform to the UAV through a data transmission channel, and the UAV performs velocity tracking control;

when the UAV performs velocity tracking control, its given velocity is the sum of given synchronous horizontal velocity, given approaching velocity and given manual velocity, wherein the desired horizontal position is obtained by performing an integral operation on the given velocity, and the approaching velocity is generated by a tracking differentiator; the input of the tracking differentiator is the real-time position of the moving base platform added by a manual position adjustment value and then subtracted by the position of the UAV, and the control is embodied in that the UAV flies to the a position right above the moving base platform for synchronous flight, and the relative position of the UAV is adjusted by manual control at the same time.

9. The control method according to claim 1, wherein the landing process specifically comprises:

an infrared indicator is installed at a UAV landing spot on the moving base platform, an infrared visual sensor is installed at the onboard terminal of the UAV, the orientations $\alpha$ and $\beta$ of the infrared indicator are acquired by the infrared visual sensor, and a ranging radar at the onboard terminal of the UAV is coaxial with the infrared camera for measuring the distance L between the infrared camera and the moving base platform and calculating the relative position X, Y of the landing spot of the UAV.

10. The control method according to claim 9, wherein:

the landing process comprises a base station guiding stage and an infrared guiding stage; in the base station guiding stage, the moving base station sends inertial navigation velocity and inertial navigation position of the moving base platform to the UAV through a data transmission channel, and the UAV performs velocity tracking control, the control effect is embodied in that the UAV flies to a position right above the moving base for synchronous flight; the landing process enters into the infrared guiding stage from the base station guiding stage after the infrared sensor detects the position of the infrared indicator.

11. The control method according to claim 10, wherein:

in the infrared guiding stage, the UAV receives inertial navigation velocity of the moving base platform sent by the moving base station, and calculates the position of the infrared indicator as a new inertial navigation position of the position of the base station, the UAV performs velocity tracking control, and its given velocity is the sum of synchronous horizontal velocity and approaching velocity, wherein the approaching velocity is generated by the tracking differentiator, the input of the tracking differentiator is the difference between the position of the infrared indicator and the position of the UAV, and the control is embodied in that the UAV flies to a position right above the infrared indicator for synchronous flight.

12. An unmanned aerial vehicle (UAV) control system based on a moving base, comprising:

a moving base station, a UAV ground station, and a UAV, wherein the moving base station is connected between the UAV ground station and the UAV for transmitting data packets between the UAV ground station and the UAV transparently, acquiring the movement state of a moving base platform, acquiring information on the movement state of the moving base platform from a GPS unit, packing up the data and sending the data packets to the UAV via a data transmission onboard terminal; the UAV performs coordinated flight control of position and velocity loops after receiving the data packets; wherein the moving base station comprises the moving base, a data transmission onboard terminal, a GPS antenna, a GPS unit, a base station processor, and a data transmission ground terminal.

13. The control method according to claim 2, wherein the coordinated flight control of position and velocity loops specifically comprises:

the following process comprises a moving base following mode, in which the moving base station sends inertial navigation velocity and inertial navigation position of the moving base platform to the UAV through a data transmission channel, and the UAV performs velocity tracking control;

when the UAV performs velocity tracking control, its given velocity is the sum of given synchronous horizontal velocity, given approaching velocity and given manual velocity, wherein the desired horizontal position is obtained by performing an integral operation on the given velocity, and the approaching velocity is generated by a tracking differentiator; the input of the tracking differentiator is the difference between the real-time position of the moving base platform and the position of the UAV, and the control is embodied in that the UAV flies to the a position right above the moving base platform for synchronous flight.

14. The control method according to claim 13, wherein the step of determining whether the current horizontal position and the current altitude meet the takeoff criteria specifically comprises:

triggering a takeoff command, so that an altitude controller of the flight control system of the UAV is enabled while a horizontal controller of the flight control system of the UAV remains disabled; after the altitude controller is enabled, a desired altitude of the UAV is increased from the current position, a throttle control value outputted from the altitude controller increases continuously, the UAV attracts the surface of the moving base platform by virtue of the attraction force generated by the electromagnet mechanism; setting a given attitude of the UAV to the current attitude, so that the attitude of the UAV sways with the surface of the moving base platform;

triggering a power-off command of the electromagnet mechanism when determining that the throttle control value outputted from the altitude controller is greater than a set value of takeoff throttle;

the UAV bounces off the surface of the moving base platform quickly after the electromagnet mechanism is de-energized, the altitude controller remains enabled, the desired altitude increases continuously, the horizontal controller remains disabled, the given attitude of the UAV is 0, the UAV takes off in a stable attitude and leaves the surface of the moving base platform; the horizontal controller is enabled after it is determined that the altitude of the UAV is greater than a set value of altitude, and the given attitude of the UAV is set to the output value of the horizontal controller; thus, the operation of takeoff from the moving base is accomplished.

15. The control method according to claim 14, wherein:
a vertical control model is established in the vertical direction by the altitude controller, which comprises a vertical position P controller, a vertical velocity P controller, and a vertical acceleration PI controller; the UAV acquires current altitude, current vertical velocity and current vertical acceleration via a combined navigation system; the desired altitude is inputted to the vertical control model; after the takeoff command is triggered, the desired altitude is increased in accordance with a ramp signal from the current position and is fed to the vertical position P controller, the vertical velocity P controller, and the vertical acceleration PI controller sequentially, so that a throttle control value is generated so as to control the UAV to take off.

16. The control method according to claim 14, wherein:
a horizontal control model is established in the horizontal direction by the horizontal controller, which comprises a horizontal position P controller and a horizontal velocity PI controller; the UAV acquires current horizontal position, current horizontal velocity and current horizontal acceleration via a combined navigation system; a desired horizontal position is inputted to the horizontal control model;

before takeoff is triggered, the horizontal position P controller and the horizontal velocity PI controller are disabled, and the given attitude of the UAV is determined according to changes of the current attitude of the UAV, as the moving base platform sways;

before the set value of takeoff altitude is reached after takeoff is triggered, the horizontal position P controller and the horizontal velocity PI controller remain disabled, and the given attitude of the UAV is set to 0, i.e., the UAV remains in a horizontal attitude after it takes off;

after the UAV reaches the set value of takeoff altitude, the horizontal position P controller and the horizontal velocity PI controller are enabled, the desired horizontal position is fed to the horizontal position P controller and the horizontal velocity PI controller, a horizontal acceleration control value is generated and converted into a given attitude of the UAV, and the attitude of the UAV is controlled; thus, the takeoff of the UAV on the moving base platform is completed.

17. The control method according to claim 16, wherein:
in the horizontal direction, three different forms of horizontal controllers are set according to the takeoff states, and different forms of horizontal controllers are switched according to different takeoff states, wherein the three corresponding takeoff states are a state before takeoff is triggered, a state before the set value of takeoff altitude is reached after takeoff is triggered, and a state after the set value of takeoff altitude is reached.

18. The control method according to claim 17, wherein the coordinated flight control of position and velocity loops specifically comprises:
the following process comprises a manual following mode, in which the moving base station sends inertial navigation velocity and inertial navigation position of the moving base platform to the UAV through a data transmission channel, and the UAV performs velocity tracking control;

when the UAV performs velocity tracking control, its given velocity is the sum of given synchronous horizontal velocity, given approaching velocity and given manual velocity, wherein the desired horizontal position is obtained by performing an integral operation on the given velocity, and the approaching velocity is generated by a tracking differentiator; the input of the tracking differentiator is the real-time position of the moving base platform added by a manual position adjustment value and then subtracted by the position of the UAV, and the control is embodied in that the UAV flies to the a position right above the moving base platform for synchronous flight, and the relative position of the UAV is adjusted by manual control at the same time.

19. The control method according to claim 2, wherein the landing process specifically comprises:
an infrared indicator is installed at a UAV landing spot on the moving base platform, an infrared visual sensor is installed at the onboard terminal of the UAV, the orientations $\alpha$ and $\beta$ of the infrared indicator are acquired by the infrared visual sensor, and a ranging radar at the onboard terminal of the UAV is coaxial with the infrared camera for measuring the distance L between the infrared camera and the moving base platform and calculating the relative position X, Y of the landing spot of the UAV.

20. The control method according to claim 19, wherein:
the landing process comprises a base station guiding stage and an infrared guiding stage; in the base station guiding stage, the moving base station sends inertial navigation velocity and inertial navigation position of the moving base platform to the UAV through a data transmission channel, and the UAV performs velocity tracking control, the control effect is embodied in that the UAV flies to a position right above the moving base for synchronous flight; the landing process enters into the infrared guiding stage from the base station guiding stage after the infrared sensor detects the position of the infrared indicator.

* * * * *